(12) United States Patent
You

(10) Patent No.: US 8,449,635 B2
(45) Date of Patent: May 28, 2013

(54) ABRASIVE ARTICLES AND METHODS FOR MAKING SAME

(75) Inventor: Xiaorong You, Shrewsbury, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 669 days.

(21) Appl. No.: 12/329,658

(22) Filed: Dec. 8, 2008

(65) Prior Publication Data

US 2009/0145044 A1   Jun. 11, 2009

Related U.S. Application Data

(60) Provisional application No. 60/992,923, filed on Dec. 6, 2007.

(51) Int. Cl.
| | |
|---|---|
| *B24B 1/00* | (2006.01) |
| *B24D 11/00* | (2006.01) |
| *C09K 3/14* | (2006.01) |
| *B24D 3/02* | (2006.01) |
| *C09C 1/68* | (2006.01) |
| *C09C 3/14* | (2006.01) |
| *G03C 1/00* | (2006.01) |
| *C09C 249/00* | (2006.01) |
| *C09C 251/00* | (2006.01) |

(52) U.S. Cl.
USPC ............... 51/295; 51/298; 51/307; 430/270.1

(58) Field of Classification Search
USPC ............ 51/295, 298, 307; 428/323, 327, 428/328; 430/270.1
See application file for complete search history.

(56) References Cited

U.S. PATENT DOCUMENTS

| | | | |
|---|---|---|---|
| 5,108,463 A | 4/1992 | Buchanan | |
| 5,126,394 A | 6/1992 | Revis et al. | |
| 5,137,542 A | 8/1992 | Buchanan et al. | |
| 5,328,716 A | 7/1994 | Buchanan | |
| 5,360,462 A * | 11/1994 | Harmer et al. | 51/295 |
| 5,417,726 A | 5/1995 | Stout et al. | |
| 5,436,063 A * | 7/1995 | Follett et al. | 442/73 |
| 5,505,747 A | 4/1996 | Chesley et al. | |
| 5,560,753 A | 10/1996 | Schnabel et al. | |
| 5,565,011 A | 10/1996 | Follett et al. | |
| 5,573,619 A | 11/1996 | Benedict et al. | |
| 5,700,302 A | 12/1997 | Stoetzel et al. | |
| 6,258,138 B1 | 7/2001 | DeVoe et al. | |
| 6,293,980 B2 | 9/2001 | Wei et al. | |

(Continued)

FOREIGN PATENT DOCUMENTS

| | | |
|---|---|---|
| KR | 10-0262803 B1 | 8/2000 |
| KR | 10-2006-0061387 A | 6/2006 |

(Continued)

*Primary Examiner* — Pegah Parvini
(74) *Attorney, Agent, or Firm* — Joseph P. Sullivan; Abel Law Group, LLP

(57) ABSTRACT

The disclosure is directed to an abrasive article. The abrasive article includes a backing having a major surface and a make layer. The make layer is disposed over the major surface of the backing. The make layer includes abrasive grains and a photoinitiator that increases the depth of ultraviolet cure of the make layer by at least about 50% compared to bis(2,4,6-trimethyl benzoyl) phenyl phosphine oxide. The disclosure is also directed to a method for forming the abrasive article.

23 Claims, 2 Drawing Sheets

| U.S. PATENT DOCUMENTS | | | | FOREIGN PATENT DOCUMENTS | | |
|---|---|---|---|---|---|---|
| 6,410,127 B1 | 6/2002 | Kamae et al. | | KR | 10-2006-0098367 A | 9/2006 |
| 6,467,897 B1 | 10/2002 | Wu et al. | | KR | 10-2007-0044062 A | 4/2007 |
| 6,949,678 B2 | 9/2005 | Kunimoto et al. | | WO | 1998/51747 | 11/1998 |
| 7,189,489 B2 | 3/2007 | Kunimoto et al. | | WO | WO 02/100903 * | 12/2002 |
| 2006/0016356 A1* | 1/2006 | Oohashi et al. | 101/465 | WO | 2005080337 A1 | 1/2005 |
| 2007/0122742 A1 | 5/2007 | Kato et al. | | | | |
| 2007/0128854 A1 | 6/2007 | Kim et al. | | | | |

* cited by examiner

ABRASIVE ARTICLES AND METHODS FOR MAKING SAME

CROSS-REFERENCE TO RELATED APPLICATIONS

The present application claims priority from U.S. Provisional Patent Application No. 60/992,923 filed Dec. 6, 2007, entitled "ABRASIVE ARTICLES AND METHODS FOR MAKING SAME," naming inventor Xiaorong You, which application is incorporated by reference herein in its entirety.

FIELD OF THE DISCLOSURE

This disclosure, in general, relates to abrasive articles and methods for making the same.

BACKGROUND

Abrasive articles, such as coated abrasives and bonded abrasives, are used in various industries to machine workpieces, such as by lapping, grinding, or polishing. Machining utilizing abrasive articles spans a wide industrial scope from optics industries, automotive paint repair industries, to metal fabrication industries. In each of these examples, manufacturing facilities use abrasives to remove bulk material or affect surface characteristics of products.

Surface characteristics include shine, texture, and uniformity. For example, manufacturers of metal components use abrasive articles to fine and polish surfaces, and oftentimes desire a uniformly smooth surface. Similarly, optics manufacturers desire abrasive articles that produce defect free surfaces to prevent light diffraction and scattering.

Particularly in the context of fine grained abrasive articles, commercially available abrasives have a tendency to leave random surface defects, such as scratches that are deeper than the average stock removal scratches. Such scratches may be caused by grains that detach from the abrasive article, causing rolling indentations. When present, these scratches scatter light, reducing optical clarity in lenses or producing haze or a foggy finish in decorative metal works. Such scratches also provide nucleation points or attachment points that reduce the release characteristics of a surface. For example, scratches in sanitary equipment allow bacteria to attach to surfaces, and scratches in polished reactors allow formation of bubbles and act as surface features for initiating unwanted reactions.

Loss of grains from abrasive articles also degrades their performance, leading to frequent replacement. Frequent abrasive article replacement is costly to manufacturers. As such, improved abrasive articles and methods for manufacturing abrasive articles would be desirable.

SUMMARY

In one particular embodiment, an abrasive article includes a backing having a major surface and a make layer disposed over the major surface of the backing. The make layer has abrasive grains and a photoinitiator that increases the depth of ultraviolet cure of the make layer by at least about 50% compared to bis(2,4,6-trimethyl benzoyl) phenyl phosphine oxide.

In another exemplary embodiment, an abrasive article includes a backing having a major surface and a make layer disposed over the major surface of the backing. The make layer includes abrasive grains and an oxime ester photoinitiator.

In a further exemplary embodiment, an abrasive article includes a backing having a major surface and a make layer disposed over the major surface of the backing. The make layer includes a cationically polymerizable component and an oxime ester photoinitiator.

In another exemplary embodiment, an abrasive article includes a backing having a major surface and a make layer disposed over the major surface of the backing. The make layer includes a cationically polymerizable component, an oxime ester photoinitiator, and abrasive grains.

In a further exemplary embodiment, a method of forming an abrasive article includes coating a make layer on a major surface of a backing to a thickness of about 50 mils. The make layer includes a photoinitiator. The method further includes curing the make layer to a depth of at least about 15 mils.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

Figure 1:
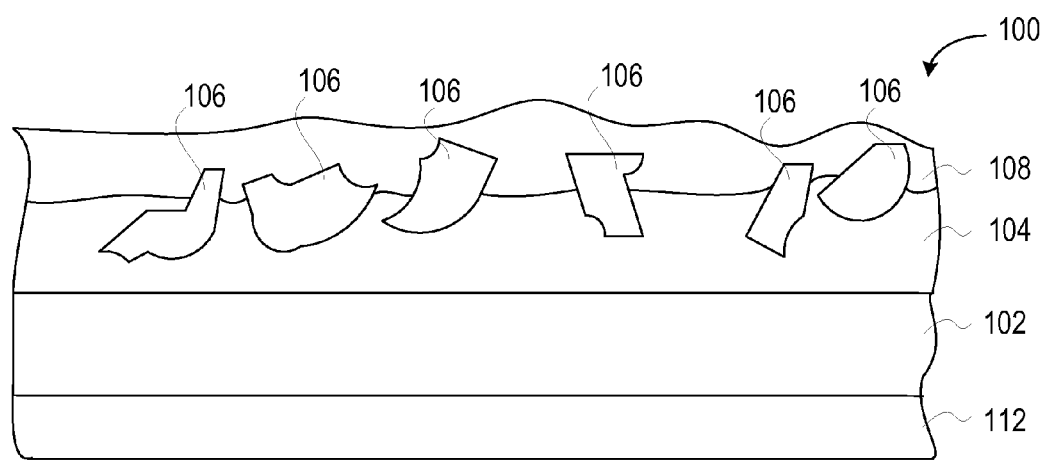
FIG. 1 includes an illustration of an exemplary coated abrasive article.

In a particular embodiment, an abrasive article includes a make layer having abrasive grains and a photoinitiator. The abrasive article can be a coated abrasive article or a bonded abrasive article. In an embodiment, a coated abrasive article is an engineered or structure abrasive article, including patterned abrasive surface structures.

In an embodiment, the make layer includes a binder. In an exemplary embodiment, the binder includes a polymer matrix and a photoinitiator. In particular embodiments, the photoinitiator increases the depth of cure of the make layer. For instance, the photoinitiator increases the depth of cure of the make layer by greater than about 50%, compared to common through-cure photoinitiators. In an embodiment, the photoinitiator increases the depth of cure by greater than about 100%, such as greater than about 200%, such as greater than about 400%, such as greater than about 500%, or even greater than about 600%, compared to common through-cure photoinitiators. For instance, the photoinitiator increases the depth of cure of the make layer by greater than about 50%, such as greater than about 100%, such as greater than about 200%, such as greater than about 250%, or even greater than about 300%, compared to bis(2,4,6-trimethyl benzoyl) phenyl phosphine oxide (Irgacure 819 available from Ciba Specialty Chemicals). In an embodiment, the depth of cure for the make layer is greater than about 15 mils, such as greater than about 20 mils, such as greater than about 30 mils, or even greater than about 40 mils.

For example, the photoinitiator that increases the depth of cure is a cationic initiator that may catalyze reactions between cationic polymerizable constituents. Exemplary photoinitiators include oxime esters and derivatives thereof.

Exemplary oxime ester photoinitiators have the formula:

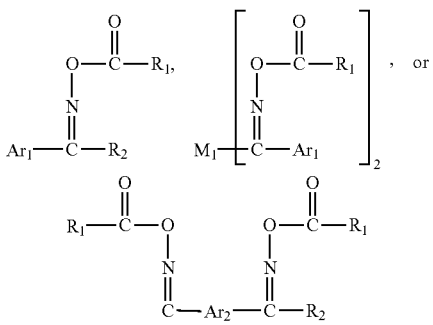

wherein $R_1$ is hydrogen, $C_3$-$C_8$ cycloalkyl or $C_1$-$C_{12}$ alkyl which is unsubstituted or substituted by one or more halogen, phenyl, and/or CN; or $R_1$ is $C_2$-$C_5$ alkenyl; or $R_1$ is phenyl which is unsubstituted or substituted by one or more $C_1$-$C_6$ alkyl, halogen, CN, $OR_3$, $SR_4$, and/or $NR_5R_6$; or $R_1$ is $C_1$-$C_8$ alkoxy, benzyloxy, or phenoxy, which is unsubstituted or substituted by one or more $C_1$-$C_6$ alkyl and/or halogen;

$R_2$ and $R_2'$ are independently at each occurence hydrogen, unsubstituted $C_1$-$C_{20}$ alkyl or $C_1$-$C_{20}$ alkyl substituted by one or more halogen, $OR_3$, phenyl and/or phenyl substituted by $OR_3$, $SR_4$, and/or $NR_5R_6$; or $R_2$ and $R_2'$ are $C_3$-$C_8$ cycloalkyl; or are $C_2$-$C_{20}$ alkyl interrupted by one or more —O— and/or optionally substituted by one or more halogen, $OR_3$, phenyl and/or phenyl substituted by $OR_3$, $SR_4$, and/or $NR_5R_6$; or $R_2$ and $R_2'$ are phenyl which is unsubstituted or substituted by one or more $C_1$-$C_6$ alkyl, phenyl, halogen, $OR_3$, $SR_4$ and/or $NR_5R_6$; or $R_2$ and $R_2'$ are $C_2$-$C_{20}$ alkanoyl or benzoyl which is unsubstituted or substituted by one or more $C_1$-$C_6$ alkyl, phenyl, $OR_3$, $SR_4$ and/or $NR_5R_6$; or $R_2$ and $R_2'$ are $C_2$-$C_{12}$ alkoxycarbonyl optionally interrupted by one or more —O— and/or optionally substituted by one or more hydroxyl groups; or $R_2$ and $R_2'$ are phenoxycarbonyl which is unsubstituted or substituted by $C_1$-$C_6$ alkyl, halogen, phenyl, $OR_3$, $SR_4$, and/or $NR_5R_6$; or $R_2$ and $R_2'$ are CN, —$CONR_5R_6$, $NO_2$, $C_1$-$C_4$ haloalkyl, $S(O)_m$—$C_1$-$C_6$ alkyl; $S(O)_m$-phenyl which optionally is substituted by $C_1$-$C_{12}$ alkyl or $SO_2$—$C_1$-$C_6$ alkyl; or are $SO_2O$-phenyl which optionally is substituted by $C_1$-$C_{12}$ alkyl; or are diphenyl phosphinoyl or di-($C_1$-$C_4$ alkoxy)-phosphinoyl; or $R_2$ and $R_2'$ are a group

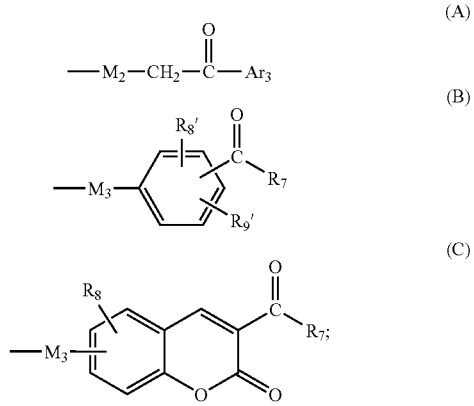

$Ar_1$ is phenyl, naphthyl, benzoyl, or naphthoyl, each of which is substituted 1 to 7 times by halogen, $C_1$-$C_{12}$ alkyl, $C_3$-$C_8$ cycloalkyl, benzyl, and/or phenoxycarbonyl; or each of which is substituted by phenyl or by phenyl which is substituted by one or more $OR_3$, $SR_4$, and/or $NR_5R_6$; or each of which is substituted by $C_2$-$C_{12}$ alkoxycarbonyl optionally interrupted by one or more —O— and/or optionally substituted by one or more hydroxyl groups; or each of which is substituted by $OR_3$, $SR_4$, $SOR_4$, $SO_2R_4$, and/or $NR_5R_6$, wherein the substituted $OR_3$, $SR_4$, or $NR_5R_6$ optionally form 5- or 6-membered rings via the radicals $R_3$, $R_4$, $R_5$, and/or $R_6$ with further substituents on the phenyl or naphthyl ring; or each of which is substituted by a group

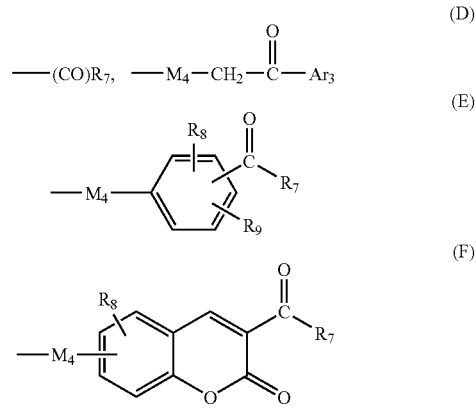

provided that if $R_2$ is not a group (A), (B), or (C), then $Ar_1$ is phenyl, naphthyl, benzoyl, or naphthoyl, each of which is substituted by at least one group —(CO)$R_7$, (D), (E), or (F);

$Ar_2$ is phenylene, naphthylene, phenylenedicarbonyl or naphthylenedicarbonyl, each of which is substituted 1 to 4 times by halogen, $C_1$-$C_{12}$ alkyl, $C_3$-$C_8$ cycloalkyl, benzyl, $OR_3$, $SR_4$, $SOR_4$, $SO_2R_4$ and/or $NR_5R_6$; or each of which is substituted by a group —(CO)$R_7$, (D), (E) or (F);

provided that if $R_2$ or $R_2'$ is not a group (A), (B) or (C) and $Ar_2$ is phenylene, naphthylene, phenylenedicarbonyl or naphthylenedicarbonyl, then $Ar_2$ is substituted by at least one of the groups —(CO)$R_7$, (D), (E) or (F);

if $R_2$ is not hydrogen or a group (A), (B) or (C), each of which is substituted by at least one of the groups —(CO)$R_7$, (D), (E) or (F), $Ar_2$ additionally is —(CO)-phenyl-$M_4'$-phenyl-(CO)— or -phenyl-$M_4''$-phenyl-each of which is unsubstituted or substituted 1 to 4 times by halogen, $C_1$-$C_{12}$ alkyl, benzyl, $OR_3$, $SR_4$ and/or $NR_5R_6$; or each of which is substituted by a group, —(CO)$R_7$, (D), (E) or (F);

if $R_2$ is a group (A), (B) or (C), $Ar_2$ additionally is —(CO)-diphenyl-$M_4'$-diphenyl-(CO)—, or -diphenyl-$M_4''$-diphenyl-each of which is unsubstituted or substituted by 1 to 4 times by halogen, $C_1$-$C_{12}$ alkyl, benzyl, $OR_3$, $SR_4$ and/or $NR_5R_6$; or each of which is substituted by a group —(CO)$R_7$, (D), (E) or (F);

or $Ar_2$ is -phenyl-$M_4$-phenyl-(CO)-phenyl-$M_4'$-phenyl-, -phenyl-(CO)$CH_2$-$M_4'$-$CH_2$(CO)-phenyl-, -phenyl-$M_4$-(phenyl-$COR_7$)-$M_4'$-phenyl-, -phenyl-$M_4$-phenyl-(CO)—$CH_2M_4'$-phenyl-, -diphenyl-(CO)$CH_2$-$M_4'$-$CH_2$(CO)-diphenyl-, -diphenyl-$M_4$-phenyl-(CO)$CH_2$-$M_4'$-diphenyl-, -diphenyl-$M_4$-phenyl-(CO)-phenyl-$M_4'$-diphenyl-, or -diphenyl-$M_4$-(phenyl-$COR_7$)-$M_4'$-diphenyl-, each of which is unsubstituted or substituted by 1 to 6 times by halogen, $C_1$-$C_{12}$ alkyl, benzyl, $OR_3$, $SR_4$ and/or $NR_5R_6$, wherein the substituents $OR_3$, $SR_4$ or $NR_5R_6$ optionally form 5- or -6 membered rings via the radicals $R_3$, $R_4$, $R_5$ and/or $R_6$ with one of the carbon atoms of the phenyl or naphthyl ring; or each of which is substituted by a group —(CO)$R_7$, (D), (E) or (F);

Ar₃ is phenyl, naphthyl or coumarinyl, each of which is substituted 1 to 7 times by halogen, $C_1$-$C_{12}$ alkyl, $C_3$-$C_8$ cycloalkyl, benzyl and/or phenoxycarbonyl; or each of which is substituted by phenyl or by phenyl which is substituted by one or more $OR_3$, $SR_4$ and/or $NR_5R_6$; or each of which is substituted by $C_2$-$C_{12}$ alkoxycarbonyl optionally interrupted by one or more —O— and/or optionally substituted by one or more hydroxyl groups; or each of which is substituted by $OR_3$, $SR_4$, $SOR_4$, $SO_2R_4$ and/or $NR_5R_6$;

$M_1$ is $C_1$-$C_{20}$ alkylene, which is optionally interrupted by one or more —O— and/or optionally substituted by one or more halogen, $OR_3$, phenyl or phenyl substituted by $OR_3$, $SR_4$ and/or $NR_5R_6$; or $M_1$ is phenylene or naphthylene, each of which is unsubstituted or substituted by one or more $C_1$-$C_6$ alkyl, phenyl, halogen, $OR_3$, $SR_4$ and/or $NR_5R_6$; or $M_1$ is a group

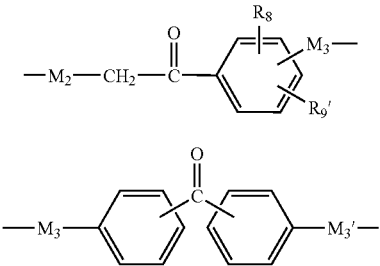

(G)

(H)

which is optionally substituted 1 to 4 times by halogen, $C_1$-$C_{12}$ alkyl, benzyl, $OR_3$, $SR_4$, $SOR_4$, $SO_2R_4$ and/or $NR_5R_6$, wherein the substituents $OR_3$, $SR_4$ or $NR_5R_6$ optionally form 5- or 6-membered rings via the radicals $R_3$, $R_4$, $R_5$ and/or $R_6$ with one of the carbon atoms of the other phenyl ring;

provided that if $Ar_1$ is phenyl, naphthyl, benzoyl or naphthoyl, each of which is not substituted by a group —(CO)$R_7$, (D), (E) or (F), then $M_1$ is a group (G) or (H), which is optionally substituted 1 to 4 times by halogen, $C_1$-$C_{12}$ alkyl, benzyl, $OR_3$, $SR_4$, $SOR_4$, $SO_2R_4$ and/or $NR_5R_6$, wherein the substituents $OR_3$, $SR_4$ or $NR_5R_6$ optionally form 5- or 6-membered rings via the radicals $R_3$, $R_4$, $R_5$ and/or $R_6$ with one of the carbon atoms of the other phenyl ring;

$M_2$ is a direct bond, $C_1$-$C_{10}$ alkylene or cyclohexylene; or $M_2$ is $C_1$-$C_{10}$ alkylene or $C_1$-$C_{10}$ alkylene-X—, each of which is optionally interrupted by one or more —O— and/or optionally substituted by one or more halogen, $OR_3$, phenyl, or phenyl substituted by $OR_3$, $SR_4$, and/or $NR_5R_6$; or $M_2$ is phenylene, naphthylene or phenylene-X—, each of which is unsubstituted or substituted by one or more $C_1$-$C_6$ alkyl, phenyl, halogen, $OR_3$, $SR_4$ and/or $NR_5R_6$; or $M_2$ is $C_1$-$C_{10}$ alkylene-C(O)—X—, $C_1$-$C_{10}$ alkylene-X—C(O)—, phenylene-C(O)—X—, or $C_1$-$C_{10}$ alkylene-phenylene-X;

$M_3$ and $M_3'$ are independently at each occurence a direct bond $C_1$-$C_{10}$ alkylene or cyclohexylene; or $M_3$ and $M_3'$ are $C_1$-$C_{10}$ alkylene or $C_1$-$C_{10}$ alkylene-X—, each of which is optionally interrupted by one or more —O— and/or optionally substituted by one or more halogen, $OR_3$, phenyl or phenyl substituted by $OR_3$, $SR_4$, and/or $NR_5N_6$; or $M_3$ and $M_3'$ are phenylene, naphthylene or phenylene-X—, each of which is unsubstituted or substituted by one or more $C_1$-$C_6$ alkyl, phenyl, halogen, $OR_3$, $SR_4$, and/or $NR_5R_6$; or $M_3$ is $C_1$-$C_{10}$ alkylene-C(O)—X—, $C_1$-$C_{10}$ alkylene-X—C(O)—, phenylene-C(O)—X—, $C_1$-$C_{10}$ alkylene-phenylene-X, or phenylene-(CO)-phenylene; provided that $M_3$ and $M_3'$ are not $C_1$-$C_{10}$ alkylene-X—, phenylene-X—, or $C_1$-$C_{10}$ alkylene-phenylene-X—, if $AR_1$ is naphthyl, naphthoyl or 2-$R_{30}$-phenyl, each of which is not substituted by a group —(CO)$R_7$, (D), (E), or (F);

$M_4$ and $M_4'$ are independently at each occurrence a direct bond, —O—, —S—, $NR_5'$—, or —CO—; or $M_4$ is —Y—($C_1$-$C_{10}$ alkylene)-Y'— which is optionally interrupted by one or more —O— and/or optionally substituted by one or more halogen, $OR_3$, phenyl or phenyl substituted by $OR_3$, $SR_4$ and/or $NR_5N_6$; or $M_4$ and $M_4'$ are —Y-phenylene-Y'— or —Y— naphthylene-Y'—, each of which is unsubstituted or substituted by one or more $C_1$-$C_6$ alkyl, phenyl, halogen, $OR_3$, $SR_4$, and/or $NR_5R_6$; or $M_4$ and $M_4'$ are —Y—($C_1$-$C_4$ alkylene)-O-phenylene-O—($C_1$-$C_4$ alkylene)-Y'— or —Y—($C_1$-$C_4$ alkylene)-O-naphthylene-O—($C_1$-$C_4$alkylene)-Y'—; or $M_4$ and $M_4'$ are —X—$C_1$-$C_{10}$ alkylene-X—C(O)— which is optionally interrupted by one or more —O—; or $M_4$ and $M_4'$ are a group —X-phenyl-(CO)-phenyl-X'— which is optionally substituted 1 to 4 times by halogen, $C_1$-$C_{12}$ alkyl, benzyl, $OR_3$, $SR_4$, $SOR_4$, $SO_2R_4$, and/or $NR_5R_6$, wherein the substituents $OR_3$, $SR_4$, $NR_5R_6$ optionally form 5- or 6-membered rings via the radicals $R_3$, $R_4$, $R_5$ and/or $R_6$ with one of the carbon atoms of the other phenyl ring or that of the phenyl or naphthyl ring attached to this group;

$M_4''$ is a direct bond, —O—, —S—, —$NR_5'$- or —CO—; or $M_4''$ is —Y—($C_1$-$C_{10}$ alkylene)-Y— which is optionally interrupted by one or more —O— and/or optionally substituted by one or more halogen, $OR_3$, phenyl or phenyl substituted by $OR_3$, $SR_4$ and/or $NR_5R_6$; or $M_4'''$ is —Y-phenylene-Y'— or —Y-naphthylene-Y'—, each of which is unsubstituted or substituted by one or more $C_1$-$C_6$ alkyl, phenyl, halogen, $OR_3$, $SR_4$ and/or $NR_5R_6$; or $M_4''$ is —X—$C_1$-$C_{10}$ alkylene-X—C(O)— which is optionally interrupted by one or more —O—;

X and X' are independently at each occurrence —O—, —S—, or —$NR_5$—;

Y and Y' are independently at each occurrence a direct bond, —O—, —S—, or —$NR_5$—;

$R_3$ is hydrogen, $C_1$-$C_{20}$ alkyl or phenyl-$C_1$-$C_3$ alkyl; or $R_3$ is $C_1$-$C_8$ alkyl which is substituted by —OH, —SH, —CN, $C_3$-$C_6$ alkenoxy, —OCH$_2$CH$_2$CN, —OCH$_2$CH$_2$(CO)O($C_1$-$C_4$alkyl), —O(CO)—($C_1$-$C_4$ alkyl), —O(CO)-phenyl, —(CO)OH and/or —(CO)O($C_1$-$C_4$ alkyl); or $R_3$ is $C_2$-$C_{12}$ alkyl which is interrupted by one or more —O—; or $R_3$ is —(CH$_2$CH$_2$O)$_{n+1}$H, —(CH$_2$CH$_2$O)$_n$(CO)—($C_1$-$C_8$ alkyl), $C_1$-$C_8$ alkanoyl, $C_2$-$C_{12}$ alkenyl, $C_3$-$C_6$ alkenoyl, $C_3$-$C_8$ cycloalkyl; or $R_3$ is benzoyl which is unsubstituted or substituted by one or more $C_1$-$C_6$ alkyl, halogen, —OH and/or $C_1$-$C_4$ alkoxy; or substituted by one or more $C_1$-$C_6$ alkyl, halogen, —OH, and/or $C_1$-$C_4$ alkoxyl; or $R_3$ is phenyl or naphthyl each of which is unsubstituted or substituted by halogen, —OH, $C_1$-$C_{12}$ alkyl, $C_1$-$C_{12}$ alkoxy, phenoxy, $C_1$-$C_{12}$ alkyl sulfanyl, phenylsulfanyl, —N($C_1$-$C_{12}$ alkyl)$_2$ and/or diphenylamino;

n is 1-20;

$R_4$ is hydrogen, $C_1$-$C_{20}$ alkyl, $C_2$-$C_{12}$ alkenyl, $C_3$-$C_8$ cycloalkyl, phenyl-$C_1$-$C_3$ alkyl; or $R_4$ is $C_1$-$C_8$ alkyl which is substituted by —OH, —SH, —CN, $C_3$-$C_6$ alkenoxy, —OCH$_2$CH$_2$CN, —OCH$_2$CH$_2$(CO)O($C_1$-$C_4$ alkyl), —O(CO)—($C_1$-$C_4$ alkyl), —O(CO)-phenyl, —(CO)OH or —(CO)O($C_1$-$C_4$ alkyl); or $R_4$ is $C_2$-$C_{12}$ alkyl which is interrupted by one or more —O— or —S—; or $R_4$ is —(CH$_2$CH$_2$O)$_{n+1}$H, —(CH$_2$CH$_2$O)$_n$(CO)—($C_1$-$C_8$ alkyl), $C_1$-$C_8$ alkanoyl, $C_2$-$C_{12}$ alkenyl, $C_3$-$C_6$ alkenoyl; or $R_4$ is benzoyl which is unsubstituted or substituted by one or more $C_1$-$C_6$ alkyl, halogen, —OH, $C_1$-$C_4$ alkoxyl or $C_1$-$C_4$ alkylsulfanyl; or $R_4$ is phenyl or naphthyl, each of which is unsubstituted or substituted by a halogen, $C_1$-$C_{12}$ alkyl, $C_1$-$C_{12}$ alkoxyl, phenyl-C$_1$-C$_3$ alkoxyl, phenoxyl, C$_1$-C$_{12}$ alkylsulfanyl, phenyl-sulfanyl, —N(C$_1$-C$_{12}$alkyl)$_2$, diphenylamino, —(CO)O(C$_1$-C$_8$ alkyl), —(CO)—C$_1$-C$_8$ alkyl or (CO)N(C$_1$-C$_8$ alkyl)$_2$;

R$_5$ and R$_6$ are independently at each occurrence hydrogen, C$_1$-C$_{20}$ alkyl, C$_2$-C$_4$ hydroxyalkyl, C$_2$-C$_{10}$ alkoxyalkyl, C$_2$-C$_5$ alkenyl, C$_3$-C$_8$ cycloalkyl, phenyl-C$_1$-C$_3$ alkyl, C$_1$-C$_8$ alkanoyl, C$_3$-C$_{12}$ alkenoyl, benzoyl; or R$_5$ and R$_6$ are phenyl or naphthyl, each of which is unsubstituted or substituted by C$_1$-C$_{12}$alkyl, benzoyl, or C$_1$-C$_{12}$ alkoxy; or R$_5$ and R$_6$ together are C$_2$-C$_6$ alkylene optionally substituted by hydroxyl, C$_1$-C$_4$ alkoxy, C$_2$-C$_4$ alkanoyloxy or benzoyloxy;

R$_5$' is hydrogen, C$_1$-C$_{20}$ alkyl, C$_2$-C$_4$ hydroxyalkyl, C$_2$-C$_{10}$ alkoxyalkyl, C$_2$-C$_5$ alkenyl, C$_3$-C$_8$ cycloalkyl, phenyl-C$_1$-C$_3$ alkyl, C$_2$-C$_8$ alkanoyl, C$_3$-C$_{12}$ alkenoyl, benzoyl; or R$_5$' is phenyl or naphthyl, each of which is unsubstituted or substituted by C$_1$-C$_{12}$ alkyl or C$_1$-C$_{12}$ alkoxy; or R$_5$' is a group

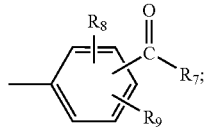

R$_7$ is hydrogen, C$_1$-C$_{20}$ alkyl; C$_1$-C$_8$ alkyl which is substituted by halogen, phenyl, —OH, —SH, —CN, C$_3$-C$_6$ alkenoxy, —OCH$_2$CH$_2$CN, —OCH$_2$CH$_2$(CO)O(C$_1$-C$_4$ alkyl), —O(CO)—(C$_1$-C$_4$ alkyl), —O(CO)-phenyl, —(CO)OH or —(CO)O(C$_1$-C$_4$ alkyl); or R$_7$ is C$_2$-C$_{12}$ alkyl which is interrupted by one or more —O—; or R$_7$ is —(CH$_2$CH$_2$O)$_{n+1}$H, —(CH$_2$CH$_2$O)$_n$(CO)—(C$_1$-C$_8$ alkyl), C$_2$-C$_{12}$ alkenyl or C$_3$-C$_8$ cycloalkyl; or R$_7$ is phenyl, biphenylyl or naphthyl, each of which optionally is substituted by one or more C$_1$-C$_6$ alkyl, halogen, CN, OR$_3$, SR$_4$, SOR$_4$, SO$_2$R$_4$ or NR$_5$R$_6$, wherein the substitutents OR$_3$, SR$_4$ or NR$_5$R$_6$ optionally form 5- or 6-membered rings via the radicals R$_3$, R$_4$, R$_5$ and/or R$_6$ with one of the carbon atoms of the phenyl, biphenylyl or naphthyl ring; R$_8$, R$_9$, R$_8$' and R$_9$' are independently at each occurrence hydrogen, C$_1$-C$_{12}$ alkyl optionally substituted by one or more halogen, phenyl, CN, —OH, —SH, C$_1$-C$_4$ alkoxy, —(CO)OH or —(CO)O(C$_1$-C$_4$ alkyl); or R$_8$, R$_9$, R$_8$' and R$_9$' are phenyl optionally substituted by one or more C$_1$-C$_6$ alkyl, halogen, CN, OR$_3$, SR$_4$ or NR$_5$R$_6$; or R$_8$, R$_9$, R$_8$' and R$_9$' are halogen, CN, OR$_3$, SR$_4$, SOR$_4$, SO$_2$R$_4$ or NR$_5$R$_6$, wherein the substituents OR$_3$, SR$_4$ or NR$_5$R$_6$ optionally form 5- or 6-membered rings via the radicals R$_3$, R$_4$, R$_5$ and/or R$_6$ with one of the carbon atoms of the phenyl, naphthyl, benzoyl or naphthoyl group of Ar$_1$ or that of the substituent R$_7$ or one of the carbon atoms of the naphthylene or phenylene group of M$_3$; or R$_8$ and R$_9$ or R$_8$' and R$_9$' together are a group

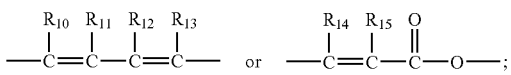

R$_{10}$, R$_{11}$, R$_{12}$ and R$_{13}$ are independently at each occurrence hydrogen, C$_1$-C$_{12}$ alkyl optionally substituted by one or more halogen, phenyl, CN, —OH, —SH, C$_1$-C$_4$ alkoxy, —(CO)OH or —(CO)O(C$_1$-C$_4$ alkyl); or R$_{10}$, R$_{11}$, R$_{12}$ and R$_{13}$ are phenyl optionally substituted by one or more C$_1$-C$_6$ alkyl, halogen, CN, OR$_3$, SR$_4$ or NR$_5$R$_6$; or R$_{10}$, R$_{11}$, R$_{12}$ and R$_{13}$ are halogen, CN, OR$_3$, SR$_4$ or NR$_5$R$_6$; and R$_{14}$ and R$_{15}$ are independently at each occurrence hydrogen, C$_1$-C$_{12}$ alkyl optionally substituted by one or more halogen, phenyl, CN, —OH, —SH, C$_1$-C$_4$ alkoxy, —(CO)OH or —(CO)O(C$_1$-C$_4$ alkyl); or R$_{14}$ and R$_{15}$ are phenyl optionally substituted by one or more C$_1$-C$_6$ alkyl, halogen, CN, OR$_3$, SR$_4$ or NR$_5$R$_6$; provided that (i) if Ar$_1$ is phenyl, which is substituted by a group (E) and is not additionally substituted by a group (D) or (F), and R$_2$ is hydrogen, then M$_4$ is no direct bond, S or NR$_5$; (ii) if Ar$_1$ is naphthyl, which is substituted by a group (E) and is not additionally substituted by a group (D) or (F), then M$_4$ is no direct bond, S, O or NR$_5$; (iii) if M$_4$ is O and R$_2$ is hydrogen, then Ar$_1$ is not phenyl which is substituted by a group (E) and is not additionally substituted by a group (D) or (F) and simultaneously substituted by OR$_3$ at the ortho position or by SR$_4$, NR$_5$R$_6$, phenyl, —(CO)R$_7$ or SO$_2$R$_7$; (iv) if Ar$_1$ is phenyl, which is substituted by —(CO)R$_7$ and is not additionally substituted by a group (D) or (F), then R$_2$ is not hydrogen; (v) if Ar$_1$ is phenyl, which is substituted by —(CO)R$_7$ and is not additionally substituted by a group (D) or (F), and R$_2$ is not hydrogen, then R$_7$ is not phenyl or C$_1$-C$_{11}$ alkyl; (vi) if Ar$_1$ is naphthyl, which is substituted by —(CO)R$_7$ and is not additionally substituted by a group (D) or (F), then R$_7$ is not phenyl or C$_1$-C$_{11}$ alkyl; exhibit an unexpectedly good performance in the depth of cure for abrasive articles.

Substituted aryl radicals Ar$_1$, Ar$_2$, Ar$_3$, M$_1$, M$_4$ or M$_4$' are substituted 1 to 7, 1 to 6 or 1 to 4 times respectively. It is evident that a defined aryl radical cannot have more substituents than free positions at the aryl ring. The radicals are substituted 1 to 7 times, for example 1 to 6 times or 1 to 4 times, in particular one, two or three times.

Substituted radicals phenyl, are substituted one to 4 times, for example one, two or three times, especially two times. Substituents on the phenyl ring are preferably in positions 4 or in 3,4-, 3,4,5-, 2,6-, 2,4- or 2,4,6-configuration on the phenyl ring.

Naphthyl is 1-naphthyl or 2-naphthyl. Naphthoyl is 1-naphthoyl or 2-naphthoyl.

Coumarinyl is 1-coumarinyl, 2-coumarinyl, 3-coumarinyl, 4-coumarinyl, 5-coumarinyl, or 6-coumarinyl.

Phenylene is 1,2-phenylene, 1,3-phenylene or 1,4-phenylene, preferably 1,4-phenylene. Naphthylene is for example 1,2-, 1,3-, 1,4-, 1,5-, 1,6-, 1,8-, 2,3-, 2,6- or 2,7-naphthlene.

Phenylenedioxy means phenylene, which is substituted by two O-atoms. Examples are 1,2-phenylenedioxy, 1,3-phenylenedioxy or 1,4-phenylenedioxy, preferably 1,4-phenylenedioxy. Naphthylenedioxy means naphthylene, which is substituted by two O-atoms. Examples are 1,2-, 1,3-, 1,4-, 1,5-, 1,6-, 1,8-, 2,3-, 2,6- or 2,7-naphthylenedioxy.

C$_1$-C$_{20}$ alkyl is linear or branched and is, for example, C$_1$-C$_{18}$—, C$_1$-C$_{14}$—, C$_1$-C$_{12}$—, C$_1$-C$_8$—, C$_1$-C$_6$— or C$_1$-C$_4$ alkyl or C$_4$-C$_{12}$— or C$_4$-C$_8$ alkyl. Examples are methyl, ethyl, propyl, isopropyl, n-butyl, sec-butyl, isobutyl, tert-butyl, pentyl, hexyl, heptyl, 2,4,4-trimethylpentyl, 2-ethylhexyl, octyl, nonyl, decyl, dodecyl, tetradecyl, pentadecyl, hexadecyl, octadecyl and icosyl. C$_1$-C$_{12}$ alkyl, C$_2$-C$_{12}$ alkyl, C$_1$-C$_{11}$ alkyl, C$_1$-C$_8$ alkyl and C$_1$-C$_6$ alkyl have the same meanings as given above for C$_1$-C$_{20}$ alkyl up to the corresponding number of C-atoms.

C$_2$-C$_{20}$ alkyl which is interrupted by one or more —O— is, for example, interrupted 1 9, 15, 13 or once or twice by —O—. Two O-atoms are separated by at least two methylene groups, namely ethylene. The alkyl groups are linear or branched. For example the following structural units will occur, —CH$_2$—CH$_2$—O—CH$_2$CH$_3$, —[CH$_2$CH$_2$O]$_y$—CH$_3$, wherein y=1-9, —(CH$_2$—CH$_2$O)$_7$—CH$_2$CH$_3$, —CH$_2$—CH(CH$_3$)—O—CH$_2$—CH$_2$CH$_3$ or —CH$_2$—CH(CH$_3$)—O—CH$_2$—CH$_3$.

$C_1$-$C_{20}$ alkylene is linear or branched and is, for example, $C_1$-$C_{16}$—, $C_1$-$C_{12}$—, $C_1$-$C_{10}$—, $C_1$-$C_8$—, $C_1$-$C_6$— or $C_1$-$C_4$ alkylene or $C_4$-$C_{12}$— or $C_4$-$C_8$ alkylene. Examples are methylene, ethylene, propylene, methylethylene, butylene, methylpropylene, ethylethylene, 1,1-dimethylethylene, 1,2-dimethylethylene, pentylene, hexylene, heptylene, 2-ethylhexylene, octylene, nonylene, decylene, dodecylene, tetradecylene, pentadecylene, hexadecylene, octadecylene and icosylene. $C_1$-$C_{10}$ alkylene has the same meanings as given above for $C_1$-$C_{20}$ alkylene up to the corresponding number of C-atoms.

Cyclohexylene is 1,2-, 1,3- or 1,4-cyclohexylene.

$C_2$-$C_4$ hydroxyalkyl means $C_2$-$C_4$ alkyl, which substituted by one or two O-atoms. The alkyl radical is linear or branched. Examples are 2-hydroxyethyl, 1-hydroxyethyl, 1-hydroxypropyl, 2-hydroxypropyl, 3-hydroxypropyl, 1-hydroxybutyl, 4-hydroxybutyl, 2-hydroxybutyl, 3-hydroxybutyl, 2,3-dihydroxypropyl, or 2,4-dihydroxybutyl.

$C_3$-$C_8$ cycloalkyl is for example cyclopropyl, cyclobutyl, cyclopentyl, cyclohexyl, cyclooctyl, especially cyclopentyl and cyclohexyl.

$C_1$-$C_{12}$ alkoxy is $C_1$-$C_{12}$ alkyl, which is substituted by one-O-atom. $C_1$-$C_{12}$ alkyl has the same meanings as given above for $C_1$-$C_{20}$ alkyl up to the corresponding number of C-atoms. $C_1$-$C_4$ alkoxy is linear or branched, for example, methoxy, ethoxy, propoxy, isopropoxy, n-butyloxy, sec-butyloxy, isobutyloxy, or tert-butyloxy.

$C_1$-$C_{12}$ alkylsulfanyl is $C_1$-$C_{12}$ alkyl, which is substituted by one-5-atom. $C_1$-$C_{12}$ alkyl has the same meanings as given above for $C_1$-$C_{20}$ alkyl up to the corresponding number of C-atoms. $C_1$-$C_4$ alkylsulfanyl is linear or branched, for example, methylsulfanyl, ethylsulfanyl, propylsulfanyl, isopropylsulfanyl, n-butylsulfanyl, sec-butylsulfanyl, isobutylsulfanyl, or tert-butylsulfanyl.

$C_2$-$C_{10}$ alkoxyalkyl is $C_2$-$C_{10}$ alkyl, which is interrupted by one O-atom. $C_2$-$C_{10}$ alkyl has the same meanings as given above for $C_1$-$C_{20}$ alkyl up to the corresponding number of C-atoms. Examples are methoxymethyl, methoxyethyl, methoxypropyl, ethoxymethyl, ethoxyethyl, ethoxypropyl, propoxymethyl, propoxyethyl, or propoxypropyl.

$C_2$-$C_{20}$ alkanoyl is linear or branched and is, for example, $C_2$-$C_{18}$—, $C_2$-$C_{14}$—, $C_2$-$C_{12}$—, $C_2$-$C_8$—, $C_2$-$C_6$— or $C_2$-$C_4$ alkanoyl or $C_4$-$C_{12}$— or $C_4$-$C_8$ alkanoyl. Examples are acetyl, propionyl, butanoyl, isobutanoyl, pentanoyl, hexanoyl, heptanoyl, octanoyl, nonanoyl, decanoyl, dodecanoyl, tetradecanoyl, pentadecanoyl, hexadecanoyl, octadecanoyl, icosanoyl, preferably acetyl. $C_1$-$C_8$ alkanoyl has the same meanings as given above for $C_2$-$C_{20}$ alkanoyl up to the corresponding number of C-atoms.

$C_2$-$C_4$ alkanoyloxy is linear or branched, for example acetyloxy, propanoyloxy, butanoyloxy, isobutanoyloxy, preferably acetyloxy.

$C_2$-$C_{12}$ alkoxycarbonyl is linear or branched and is, for example, methoxycarbonyl, ethoxycarbonyl, propoxycarbonyl, n-butyloxycarbonyl, isobutyloxycarbonyl, 1,1-dimethylpropoxycarbonyl, pentyloxycarbonyl, hexyloxycarbonyl, heptyloxycarbonyl, octyloxycarbonyl, nonyloxycarbonyl, decyloxycarbonyl or dodecyloxycarbonyl, especially methoxycarbonyl, ethoxycarbonyl, propoxycarbonyl, n-butyloxycarbonyl or iso-butyloxycarbonyl, preferably methoxycarbonyl.

$C_2$-$C_{12}$ alkoxycarbonyl which is interrupted by one or more —O— is linear or branched. Two O-atoms are separated by at least two methylene groups, namely ethylene.

Phenoxycarbonyl is —(CO)O-phenyl.

Substituted phenoxycarbonyl radicals are substituted one to four times, for example one, two or three times, especially two or three times. Substituents on the phenyl ring are preferably in positions 4 or in 3,4-, 3,4,5-, 2,6-, 2,4- or 2,4,6-position on the phenyl ring, in particular in 4- or 3,4-position.

Phenyl-$C_1$-$C_3$ alkyl is for example benzyl, phenylethyl, α-methylbenzyl or α, α-dimethylbenzyl, especially benzyl.

$C_2$-$C_{12}$ alkenyl radicals may be mono- or polyunsaturated and are, for example, vinyl, allyl, methallyl, 1,1-dimethylallyl, 1-butenyl, 3-butenyl, 2-butenyl, 1,3-pentadienyl, 5-hexenyl, 7-octenyl or dodecenyl, especially allyl. $C_2$-$C_5$ alkenyl radicals have the same meanings as given above for $C_2$-$C_{12}$ alkenyl radicals up to the corresponding number of C-atoms.

$C_3$-$C_6$ alkenoxy radicals may be mono- or polyunsaturated and are, for example, allyloxy, methallyloxy, butenyloxy, pentenoxy, 1,3-pentadienyloxy, or 5-hexenyloxy.

$C_3$-$C_{12}$ alkenoyl radicals may be mono- or polyunsaturated and are, for example, propenoyl, 2-methyl-propenoyl, butenoyl, peritenoyl, 1,3-pentadienoyl, or 5-hexenoyl. $C_3$-$C_6$ alkenoyl radicals have the same meanings as given above for $C_3$-$C_{12}$ alkenoyl radicals up to the corresponding number of C-atoms.

Halogen is fluorine, chlorine, bromine and iodine, especially fluorine, chlorine and bromine, preferably fluorine and chlorine.

If the substituents $OR_3$, $SR_4$ and $NR_5R_6$ on a phenyl, naphthyl or benzoyl ring form 5- or 6-membered rings via the radicals $R_3$, $R_4$, $R_5$ and/or $R_6$ with further substituents on the phenyl or naphthyl ring, structures comprising two or three rings (inclusive the phenyl ring) are obtained. An exemplary ring structure is

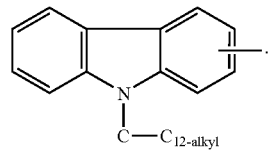

If the substituents $OR_3$, $SR_4$ or $NR_5N_6$ on a group —X-phenyl-(CO)-phenyl-X'— as $M_4$ or $M_4'$ optionally form 5- or 6-membered rings via the radicals $R_3$, $R_4$, $R_5$ and/or $R_6$ with one of the carbon atoms of the other phenyl ring or that of the phenyl or naphthyl ring attached to this group, structures comprising two or three rings (inclusive the phenyl rings) are obtained.

If, for example $R_8$, $R_9$, $R_8'$, $R_9'$ and $NR_5R_6$, wherein the substitutents $NR_5R_6$ form 5- or 6-membered rings via the radicals $R_5$ and/or $R_6$ with one of the carbon atoms of the phenyl, naphthyl, benzoyl or naphthoyl group of $Ar_1$, the following structure is preferred

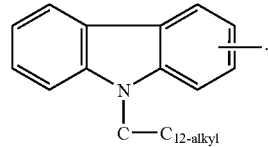

In an embodiment, these groups may bear further substitutents.

If the substituents $OR_3$, $SR_4$ or $NR_5N_6$ on the phenyl group as $R_8$ and/or $R_9$ optionally form 5- or 6-membered rings via the radicals $R_3$, $R_4$, $R_5$ and/or $R_6$ with one of the carbon atoms of the phenyl, naphthyl, benzoyl or naphthoyl group of $Ar_1$ or that of the substituent $R_7$, structures comprising two or three rings (inclusive the phenyl rings) are obtained.

Such oxime ester photoinitiators are described in, for example, U.S. Pat. No. 6,949,678 and U.S. Pat. No. 7,189,489. The oxime ester photoinitiator as described herein has a solubility of greater than about 40% by weight, or even greater than about 50% by weight. In an embodiment, the oxime ester photoinitiator is present, relative to the total weight of the binder that forms the make layer, at not greater than about 0.50 wt %, such as not greater than about 0.35 wt %, such as not greater than about 0.30 wt %, or even not greater than about 0.20 wt %. In an embodiment, the oxime ester photoinitiator is present from about 0.05 wt % to about 0.20 wt %, or about 0.10 wt % to about 0.20 wt %.

The binders described herein can be a binder formulation that includes the oxime ester photoinitiator and particulate filler dispersed in the polymer matrix. Prior to curing, the composite binder formulation is typically a suspension that includes an external phase including organic polymeric constituents and, optionally, solvents. A polymeric constituent may be a monomer or a polymer in solvent. For example, the external phase may include monomers that polymerize upon curing. Alternatively or in addition, the external phase may include polymer material in a solvent. The particulate filler generally forms a dispersed phase within the external phase.

The external phase may include one or more reaction constituents or polymer constituents for the preparation of a polymer. A polymer constituent may include monomeric molecules, polymeric molecules or a combination thereof. The external phase may further comprise components selected from the group consisting of solvents, plasticizers, chain transfer agents, catalysts, stabilizers, dispersants, curing agents, reaction mediators and agents for influencing the fluidity of the dispersion.

The polymer constituents can form thermoplastics or thermosets. By way of example, the polymer constituents may include monomers and resins for the formation of polyurethane, polyurea, polymerized epoxy, polyester, polyimide, polysiloxanes (silicones), polymerized alkyd, styrene-butadiene rubber, acrylonitrile-butadiene rubber, polybutadiene, or, in general, reactive resins for the production of thermoset polymers. Another example includes an acrylate or a methacrylate polymer constituent. The precursor polymer constituents are typically curable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent which cause the polymer to cure or polymerize). A precursor polymer constituent example includes a reactive constituent for the formation of an amino polymer or an aminoplast polymer, such as alkylated urea-formaldehyde polymer, melamine-formaldehyde polymer, and alkylated benzoguanamine-formaldehyde polymer; acrylate polymer including acrylate and methacrylate polymer, alkyl acrylate, acrylated epoxy, acrylated urethane, acrylated polyester, acrylated polyether, vinyl ether, acrylated oil, or acrylated silicone; alkyd polymer such as urethane alkyd polymer; polyester polymer; reactive urethane polymer; phenolic polymer such as resole and novolac polymer; phenolic/latex polymer; epoxy polymer such as bisphenol epoxy polymer; isocyanate; isocyanurate; polysiloxane polymer including alkylalkoxysilane polymer; or reactive vinyl polymer. The external phase of the binder formulation may include a monomer, an oligomer, a polymer, or a combination thereof. In a particular embodiment, the external phase of the binder formulation includes monomers of at least two types of polymers that when cured may crosslink. For example, the external phase may include epoxy constituents and acrylic constituents that when cured form an epoxy/acrylic polymer.

In an exemplary embodiment, the polymer reaction components include anionically and cationically polymerizable precursors. For example, the external phase may include at least one cationically curable component, e.g., at least one cyclic ether component, cyclic lactone component, cyclic acetal component, cyclic thioether component, spiro orthoester component, epoxy-functional component, or oxetane-functional component. Typically, the external phase includes at least one component selected from the group consisting of epoxy-functional components and oxetane-functional components. The external phase may include, relative to the total weight of the composite binder formulation, at least about 10 wt % of cationically curable components, for example, at least about 20 wt %, typically at least about 40 wt %, or at least about 50 wt %. Generally, the external phase includes, relative to the total weight of the composite binder formulation, not greater than about 95 wt % of cationically curable components, for example, not greater than about 90 wt %, not greater than about 80 wt %, or not greater than about 70 wt %.

The external phase may include at least one epoxy-functional component, e.g., an aromatic epoxy-functional component ("aromatic epoxy") or an aliphatic epoxy-functional component ("aliphatic epoxy"). Epoxy-functional components are components comprising one or more epoxy groups, i.e., one or more three-member ring structures (oxiranes).

Aromatic epoxy components include one or more epoxy groups and one or more aromatic rings. The external phase may include one or more aromatic epoxy components. An example of an aromatic epoxy component includes an aromatic epoxy derived from a polyphenol, e.g., from bisphenols, such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenol, or 4,4'-(9-fluorenylidene)diphenol. The bisphenol may be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F.

A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether.

In addition, an example of an aromatic epoxy includes epoxy novolac, for example, phenol epoxy novolac and cresol epoxy novolac. A commercial example of a cresol epoxy novolac includes, for example, EPICLON N-660, N-665, N-667, N-670, N-673, N-680, N-690, or N-695, manufactured by Dainippon Ink and Chemicals, Inc. An example of a phenol epoxy novolac includes, for example, EPICLON N-740, N-770, N-775, or N-865, manufactured by Dainippon Ink and Chemicals Inc.

In one embodiment, the external phase may contain, relative to the total weight of the composite binder formulation, at least 10 wt % of one or more aromatic epoxies.

Aliphatic epoxy components have one or more epoxy groups and are free of aromatic rings. The external phase may include one or more aliphatic epoxies. An example of an aliphatic epoxy includes glycidyl ether of $C_2$-$C_{30}$ alkyl; 1,2 epoxy of $C_3$-$C_{30}$ alkyl; mono or multi glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols.

In one embodiment, the aliphatic epoxy includes one or more cycloaliphatic ring structures. For example, the aliphatic epoxy may have one or more cyclohexene oxide structures, for example, two cyclohexene oxide structures. An example of an aliphatic epoxy comprising a ring structure includes hydrogenated bisphenol A diglycidyl ether, hydrogenated bisphenol F diglycidyl ether, hydrogenated bisphenol S diglycidyl ether, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di(3,4-epoxycyclohexylmethyl)hexanedioate, di(3,4-epoxy-6-methylcyclohexylmethyl)hexanedioate, ethylenebis(3,4-epoxycyclohexanecarboxylate), ethanedioldi(3,4-epoxycyclohexylmethyl)ether, or 2-(3,4-epoxycyclohexyl-5,5-spiro-3,4-epoxy)cyclohexane-1,3-dioxane. An example of an aliphatic epoxy is also listed in U.S. Pat. No. 6,410,127.

In an embodiment, the external phase includes, relative to the total weight of the composite binder formulation, at least about 5 wt % of one or more aliphatic epoxies, for example, at least about 10 wt % or at least about 20 wt % of the aliphatic epoxy. Generally, the external phase includes, relative to the total weight of the composite binder formulation, not greater than about 70 wt % of the aliphatic epoxy, for example, not greater than about 50 wt %, not greater than about 40 wt %.

Typically, the external phase includes one or more mono or poly glycidylethers of aliphatic alcohols, aliphatic polyols, polyesterpolyols or polyetherpolyols. An example of such a component includes 1,4-butanedioldiglycidylether, glycidylether of polyoxyethylene or polyoxypropylene glycol or triol of molecular weight from about 200 to about 10,000; glycidylether of polytetramethylene glycol or poly(oxyethylene-oxybutylene) random or block copolymers. An example of commercially available glycidylether includes a polyfunctional glycidylether, such as Heloxy 48, Heloxy 67, Heloxy 68, Heloxy 107, and Grilonit F713; or monofunctional glycidylethers, such as Heloxy 71, Heloxy 505, Heloxy 7, Heloxy 8, and Heloxy 61 (sold by Resolution Performances, www.resins.com).

The external phase may contain about 3 wt % to about 40 wt %, more typically about 5 wt % to about 20 wt % of mono or poly glycidyl ethers of an aliphatic alcohol, aliphatic polyol, polyesterpolyol or polyetherpolyol.

The external phase may include one or more oxetane-functional components ("oxetanes"). Oxetanes are components having one or more oxetane groups, i.e., one or more four-member ring structures including one oxygen and three carbon members.

Examples of oxetanes include components represented by the following formula:

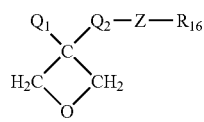

wherein $Q_1$ represents a hydrogen atom, an alkyl group having 1 to 6 carbon atoms (such as a methyl, ethyl, propyl, or butyl group), a fluoroalkyl group having 1 to 6 carbon atoms, an allyl group, an aryl group, a furyl group, or a thienyl group;

$Q_2$ represents an alkylene group having 1 to 6 carbon atoms (such as a methylene, ethylene, propylene, or butylene group), or an alkylene group containing an ether linkage, for example, an oxyalkylene group, such as an oxyethylene, oxypropylene, or oxybutylene group Z represents an oxygen atom or a sulfur atom; and $R_{16}$ represents a hydrogen atom, an alkyl group having 1-6 carbon atoms (e.g., a methyl group, ethyl group, propyl group, or butyl group), an alkenyl group having 2-6 carbon atoms (e.g., a 1-propenyl group, 2-propenyl group, 2-methyl-1-propenyl group, 2-methyl-2-propenyl group, 1-butenyl group, 2-butenyl group, or 3-butenyl group), an aryl group having 6-18 carbon atoms (e.g., a phenyl group, naphthyl group, anthranyl group, or phenanthryl group), a substituted or unsubstituted aralkyl group having 7-18 carbon atoms (e.g., a benzyl group, fluorobenzyl group, methoxy benzyl group, phenethyl group, styryl group, cynnamyl group, ethoxybenzyl group), an aryloxyalkyl group (e.g., a phenoxymethyl group or phenoxyethyl group), an alkylcarbonyl group having 2-6 carbon atoms (e.g., an ethylcarbonyl group, propylcarbonyl group, or butylcarbonyl group), an alkoxy carbonyl group having 2-6 carbon atoms (e.g., an ethoxycarbonyl group, propoxycarbonyl group, or butoxycarbonyl group), an N-alkylcarbamoyl group having 2-6 carbon atoms (e.g., an ethylcarbamoyl group, propylcarbamoyl group, butylcarbamoyl group, or pentylcarbamoyl group), or a polyethergroup having 2-1000 carbon atoms. One particularly useful oxetane includes 3-ethyl-3-(2-ethylhexyloxymethyl) oxetane.

In addition to or instead of one or more cationically curable components, the external phase may include one or more free radical curable components, e.g., one or more free radical polymerizable components having one or more ethylenically unsaturated groups, such as (meth)acrylate (i.e., acrylate or methacrylate) functional components.

An example of a monofunctional ethylenically unsaturated component includes acrylamide, N,N-dimethylacrylamide, (meth)acryloylmorpholine, 7-amino-3,7-dimethyloctyl (meth)acrylate, isobutoxymethyl(meth)acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl(meth)acrylamidetetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, butoxyethyl (meth)acrylate, pentachlorophenyl (meth)acrylate, pentabromophenyl (meth)acrylate, polyethylene glycol mono(meth)acrylate, polypropylene glycol mono(meth)acrylate, bornyl (meth)acrylate, methyltriethylene diglycol (meth)acrylate, or a combination thereof.

An example of the polyfunctional ethylenically unsaturated component includes ethylene glycol di(meth)acrylate, dicyclopentenyl di(meth)acrylate, triethylene glycol diacrylate, tetraethylene glycol di(meth)acrylate, tricyclodecanediyldimethylene di(meth)acrylate, trimethylolpropane tri(meth)acrylate, ethoxylated trimethylolpropane tri(meth) acrylate, propoxylated trimethylolpropane tri(meth)acrylate, tripropylene glycol di(meth)acrylate, neopentyl glycol di(meth)acrylate, both-terminal (meth)acrylic acid adduct of bisphenol A diglycidyl ether, 1,4-butanediol di(meth)acrylate, 1,6-hexanediol di(meth)acrylate, polyethylene glycol di(meth)acrylate, (meth)acrylate-functional pentaerythritol derivatives (e.g., pentaerythritol tri(meth)acrylate, pentaerythritol tetra(meth)acrylate, dipentaerythritol hexa(meth)acrylate, dipentaerythritol penta(meth)acrylate, or dipentaerythritol tetra(meth)acrylate), ditrimethylolpropane tetra(meth)acrylate, ethoxylated bisphenol A di(meth)acrylate, propoxylated bisphenol A di(meth)acrylate, ethoxylated hydrogenated bisphenol A di(meth)acrylate, propoxylated-modified hydrogenated bisphenol A di(meth)acrylate, ethoxylated bisphenol F di(meth)acrylate, or a combination thereof.

In one embodiment, the binder formulation comprises one or more components having at least 3 (meth)acrylate groups, for example, 3 to 6 (meth)acrylate groups or 5 to 6 (meth)acrylate groups.

In particular embodiments, the external phase includes, relative to the total weight of the composite binder formulation, at least about 3 wt % of one or more free radical polymerizable components, for example, at least about 5 wt % or at least about 9 wt %. Generally, the external phase includes not greater than about 50 wt % of free radical polymerizable components, for example, not greater than about 35 wt %, not greater than about 25 wt %, not greater than about 20 wt %, or not greater than about 15 wt %.

Generally, the polymer reaction constituents or precursors have on average at least two functional groups, such as on average at least 2.5 or at least 3.0 functional groups. For example, an epoxy precursor may have 2 or more epoxy-functional groups. In another example, an acrylic precursor may have two or more methacrylate functional groups.

In an embodiment, the external phase includes a component having a polyether backbone. An example of a compound having a polyether backbone includes polytetramethylenediol, a glycidylether of polytetramethylenediol, an acrylate of polytetramethylenediol, a polytetramethylenediol containing one or more polycarbonate groups, or a combination thereof. In an embodiment, the external phase includes between 5 wt % and 20 wt % of a compound having a polyether backbone.

The binder generally includes the polymer matrix, the oxime ester photoinitiator, and particulate filler. In an embodiment, the binder is a colloidal composite binder formed from a binder formulation including a colloidal suspended particulate filler within the external phase including polymeric components, such as monomers or polymers. The binder formulation may further include catalysts, secondary polymerization initiators, chain transfer agents, reaction inhibitors, plasticizers and dispersants.

The particulate filler may be formed of inorganic particles, such as particles of, for example, a metal (such as, for example, steel, silver, or gold) or a metal complex such as, for example, a metal oxide, a metal hydroxide, a metal sulfide, a metal halogen complex, a metal carbide, a metal phosphate, an inorganic salt (like, for example, $CaCO_3$), a ceramic, or a combinations thereof. An example of a metal oxide is ZnO, CdO, $SiO_2$, $TiO_2$, $ZrO_2$, $CeO_2$, $SnO_2$, $MoO_3$, $WO_3$, $Al_2O_3$, $In_2O_3$, $La_2O_3$, $Fe_2O_3$, CuO, $Ta_2O_5$, $Sb_2O_3$, $Sb_2O_5$, or a combination thereof. A mixed oxide containing different metals may also be present. The nanoparticles may include, for example, particles selected from the group consisting of ZnO, $SiO_2$, $TiO_2$, $ZrO_2$, $SnO_2$, $Al_2O_3$, co-formed silica alumina and a mixture thereof. The nanometer sized particles may also have an organic component, such as, for example, carbon black, a highly crosslinked/core shell polymer nanoparticle, an organically modified nanometer-size particle, etc. Such fillers are described in, for example, U.S. Pat. No. 6,467,897 and WO 98/51747. In a particular embodiment, the filler includes dark colored filler such as carbon nanotubes, graphite, carbon black, aggregates, agglomerates, or combinations thereof.

Particulate filler formed via solution-based processes, such as sol-formed and sol-gel formed ceramics, are particularly well suited for use in the binder. Suitable sols are commercially available. For example, colloidal silicas in aqueous solutions are commercially available under such trade designations as "LUDOX" (E.I. DuPont de Nemours and Co., Inc. Wilmington, Del.), "NYACOL" (Nyacol Co., Ashland, Mass.) and "NALCO" (Nalco Chemical Co., Oak Brook, Ill.). Many commercially available sols are basic, being stabilized by alkali, such as sodium hydroxide, potassium hydroxide, or ammonium hydroxide. Additional examples of suitable colloidal silica are described in U.S. Pat. No. 5,126,394. Especially well-suited are sol-formed silica and sol-formed alumina. The sols can be functionalized by reacting one or more appropriate surface-treatment agents with the inorganic oxide substrate particles in the sol.

In a particular embodiment, the particulate filler is sub-micron sized. For example, the particulate filler may be a nano-sized particulate filler, such as a particulate filler having an average particle size of about 3 nm to about 500 nm. In an exemplary embodiment, the particulate filler has an average particle size of about 3 nm to about 200 nm, such as about 3 nm to about 100 nm, about 3 nm to about 50 nm, about 8 nm to about 30 nm, or about 10 nm to about 25 nm. In particular embodiments, the average particle size is not greater than about 500 nm, such as not greater than about 200 nm, less than about 100 nm, or not greater than about 50 nm. For the particulate filler, the average particle size may be defined as the particle size corresponding to the peak volume fraction in a small-angle neutron scattering (SANS) distribution curve or the particle size corresponding to 0.5 cumulative volume fraction of the SANS distribution curve.

The particulate filler may also be characterized by a narrow distribution curve having a half-width not greater than about 2.0 times the average particle size. For example, the half-width may be not greater than about 1.5 or not greater than about 1.0. The half-width of the distribution is the width of the distribution curve at half its maximum height, such as half of the particle fraction at the distribution curve peak. In a particular embodiment, the particle size distribution curve is mono-modal. In an alternative embodiment, the particle size distribution is bi-modal or has more than one peak in the particle size distribution.

In a particular embodiment, the binder formulation may include at least two particulate fillers. Each of the particulate fillers may be formed of a material selected from the materials described above in relation to the particulate filler. The particulate fillers may be of the same material or of different materials. For example, each of the particulate fillers may be formed of silica. In an alternative example, one filler may be formed of silica and another filler may be formed of alumina. In an example, each of the particulate fillers has a particle size distribution having an average particle size not greater than about 1000 nm, such as not greater than about 500 nm or less than about 100 nm. In another example, one of the particulate fillers has a particle size distribution having an average particle size not greater than about 1000 nm, such as not greater than about 500 nm or less than about 100 nm, while a second particulate filler has an average particle size greater than about 1 micron, such as about 1 micron to about 10 microns or about 1 micron to about 5 microns. Alternatively, the second particulate filler may have an average particle size as high as 1500 microns. In a particular embodiment, a binder formulation including a first particulate filler having a submicron average particle size and a second particulate filler having an average particle size greater than 1 micron advantageously provides improved mechanical properties when cured to form a binder.

The particulate filler is generally dispersed in an external phase. Prior to curing, the particulate filler is colloidal dispersed within the binder suspension and forms a colloidal composite binder once cured. For example, the particulate material may be dispersed such that Brownian motion sustains the particulate filler in suspension. In general, the particulate filler is substantially free of particulate agglomerates. For example, the particulate filler may be substantially monodisperse such that the particulate filler is dispersed as single particles, and, in particular examples, has only insignificant particulate agglomeration, if any.

The fraction of the dispersed particulate filler phase can be, relative to the total weight of the binder formulation, about 5% to about 80% by weight, for example, about 5% to about 70% by weight, typically from about 5% to about 50% by weight, and more typically from about 20% to about 45% by weight. The colloidal dispersed and submicron particulate fillers described above are particularly useful in concentrations at least about 5 wt %, such as at least about 10 wt %, at least about 15 wt %, at least about 20 wt %, or as great as 40 wt % or higher.

The external phase may also include catalysts and secondary initiators in addition to the oxime ester photoinitiators described above. As stated earlier, a cationic initiator may catalyze reactions between cationic polymerizable constituents. A radical initiator may activate free-radical polymerization of radically polymerizable constituents. The secondary initiator may be activated by thermal energy or actinic radiation. For example, the secondary initiator may include a cationic photoinitiator that catalyzes cationic polymerization reactions when exposed to actinic radiation. An example of a secondary cationic photoinitiator includes, for example, onium salt with anions of weak nucleophilicity. In another example, the additional initiator may include a radical photoinitiator that initiates free-radical polymerization reactions when exposed to actinic radiation. Actinic radiation includes particulate or non-particulate radiation and is intended to include electron beam radiation and electromagnetic radiation. In a particular embodiment, electromagnetic radiation includes radiation having at least one wavelength in the range of about 100 nm to about 700 nm and, in particular, wavelengths in the ultraviolet range of the electromagnetic spectrum.

A useful secondary cationic photoinitiator that is commercially available includes an aromatic sulfonium complex salt, available, for example, under the trade designation "FX-512" from Minnesota Mining and Manufacturing Company, St. Paul, Minn., an aromatic sulfonium complex salt having the trade designation "UVI-6974", available from Dow Chemical Co., or Chivacure 1176.

In particular examples, the binder formulation may include, relative to the total weight of the binder formulation, less than about 20.0 wt %, such as about 0.1 wt % to about 20.0 wt % of one or more secondary initiators, for example, about 1.0 wt % to about 15.0 wt % of the one or more secondary initiators, or about 1.0 wt % to about 10.0 wt % of the one or more secondary initiators, or about 0.1 wt % to 2.0 wt % of the one or more secondary initiators, based on the total weight of the binder formulation. Optionally, organometallic salt catalysts can be used and accompanied by an accelerator, such as an oxalate ester of a tertiary alcohol. If present, the accelerator desirably is from about 0.1% to about 4.0% by weight of the total binder formulation.

Optionally, a thermal curative may be included in the external phase. Such a thermal curative is generally thermally stable at temperatures at which mixing of the components takes place. Exemplary thermal curatives for epoxy resins and acrylates are well known in the art, and are described, for example, in U.S. Pat. No. 6,258,138 (DeVoe et al.). A thermal curative may be present in a binder precursor in any effective amount. Such amounts are typically in the range of about 0.01 wt % to about 5.0 wt %, desirably in the range from about 0.025 wt % to about 2.0 wt % by weight, based upon the weight of the binder formulation, although amounts outside of these ranges may also be useful.

The external phase may also include other components such as solvents, plasticizers, crosslinkers, chain transfer agents, stabilizers, dispersants, curing agents, reaction mediators and agents for influencing the fluidity of the dispersion. For example, the external phase can also include one or more chain transfer agents such as polyol, polyamine, linear or branched polyglycol ether, polyester and polylactone.

In another example, the binder formulation may include additional components, such as a hydroxy-functional or an amine functional component or additive. Generally, the particular hydroxy-functional component is absent curable groups (such as, for example, acrylate-, epoxy-, or oxetane groups) and are not selected from the group consisting of photoinitiators. A hydroxy-functional component may be helpful in further tailoring mechanical properties of the coating formulation upon cure. A hydroxy-functional component includes a monol (a hydroxy-functional component comprising one hydroxy group) or a polyol (a hydroxy-functional component comprising more than one hydroxy group). An exemplary hydroxy-functional component includes polyether or polyester.

For the purpose of influencing the viscosity of the external phase and, in particular, viscosity reduction or liquefaction, the polyol, polyether or saturated polyester or mixtures thereof may, where appropriate, be admixed with a further suitable auxiliary, particularly a solvent, a plasticizer, a diluent or the like. In an embodiment, the compositions may comprise, relative to the total weight of the binder formulation, not greater than about 15 wt %, such as not greater than about 10 wt %, not greater than about 6 wt %, not greater than about 4 wt %, not greater than about 2 wt %, or about 0 wt % of a hydroxy-functional component. In one example, the binder formulations are free of substantial amounts of a hydroxy-functional component. The absence of substantial amounts of hydroxy-functional components may decrease the hygroscopicity of the binder formulations or articles obtained therewith.

The external phase may further include a dispersant for interacting with and modifying the surface of the particulate filler. For example, a dispersant may include organosiloxane, functionalized organosiloxane, alkyl-substituted pyrrolidone, polyoxyalkylene ether, ethyleneoxide propyleneoxide copolymer or a combination thereof. For various particulate fillers and, in particular, for silica filler, a suitable surface modifier includes siloxane.

Further examples of a suitable dispersant include anionic dispersants such as ($C_8$-$C_{16}$) alkylbenzene sulfonate, ($C_8$-$C_{16}$) alkane sulfonate, ($C_8$-$C_{18}$) α-olefin sulfonate, α-sulfo ($C_8$-$C_{16}$) fatty acid methyl ester, ($C_8$-$C_{16}$) fatty alcohol sulfate, mono- or di-alkyl sulfosuccinate with each alkyl independently being a ($C_8$-$C_{16}$) alkyl group, alkyl ether sulfate, a ($C_8$-$C_{16}$) salt of carboxylic acid or isethionate having a fatty chain of about 8 to about 18 carbons, for example, sodium diethylhexyl sulfosuccinate, sodium methyl benzene sulfonate, or sodium bis(2-ethylhexyl) sulfosuccinate (for example, Aerosol OT or AOT).

Generally, the binder formulation includes not greater than about 5 wt % dispersant, such as about 0.1 wt % to about 5.0 wt % dispersant, or about 0.1 wt % and 2 wt % dispersant, based on the total weight of the binder formulation.

The binder formulation including an external phase comprising polymeric or monomeric constituents, the oxime ester photoinitiator and dispersed particulate filler may be used to form a make coat, a size coat, a compliant coat, or a back coat of a coated abrasive article. In an exemplary process for forming a make coat, the binder formulation is coated on a backing, abrasive grains are applied over the make coat, and the make coat is cured. A size coat may be applied over the make coat and abrasive grains. In another exemplary embodiment, the binder formulation is blended with the abrasive grains to form an abrasive slurry that is coated on a backing and cured. Alternatively, the abrasive slurry is applied to a mold, such as injected into a mold and cured to form a bonded abrasive article.

The abrasive grains may be formed of any one of or a combination of abrasive grains, including silica, alumina (fused or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery. For example, the abrasive grains may be selected from a group consisting of silica, alumina, zirconia, silicon carbide, silicon nitride, boron nitride, garnet, diamond, cofused alumina zirconia, ceria, titanium diboride, boron carbide, flint, emery, alumina nitride, and a blend thereof. Particular embodiments have been created by use of dense abrasive grains comprised principally of alpha-alumina.

The abrasive grain may also have a particular shape. An example of such a shape includes a rod, a triangle, a pyramid, a cone, a solid sphere, a hollow sphere or the like. Alternatively, the abrasive grain may be randomly shaped.

The abrasive grains generally have an average grain size not greater than about 2000 microns, such as not greater than about 1500 microns. In another example, the abrasive grain size is not greater than about 750 microns, such as not greater than about 350 microns. For example, the abrasive grain size may be at least 0.1 microns, such as from about 0.1 microns to about 1500 microns, and more typically from about 0.1 microns to about 200 microns or from about 1 micron to about 100 microns. The grain size of the abrasive grains is typically specified to be the longest dimension of the abrasive grain. Generally, there is a range distribution of grain sizes. In some instances, the grain size distribution is tightly controlled.

In a blended abrasive slurry including the abrasive grains and the binder formulation, the abrasive grains provide from about 10% to about 90%, such as from about 30% to about 80%, of the weight of the abrasive slurry.

In an embodiment, the abrasive grains and/or filler may be added such that the make layer has a color measurement L* of not greater than about 50, such as not greater than about 45, such as not greater than about 40, such as not greater than about 35, such as not greater than about 30, such as not greater than about 25, such as not greater than about 20, such as not greater than about 15, such as not greater than about 10, or even not greater than about 5. Color measurements may be made with a Hunterlab Miniscan XLE calorimeter, made by Hunter Associates Laboratory of Reston, Va. The instrument illuminates the sample target with diffuse illumination and observes the reflected light at an 8 degree angle with a spectrophotometer covering the range 400-700 nm. Output from the calorimeter was presented using the CIE 1976 L*a*b* scale, wherein: L* measures lightness and varies between 0 and 100 (100 is white/1 is black); a* measures redness when positive, gray when zero and greenness when negative; b* measures yellowness when positive, gray when zero and blueness when negative.

The abrasive slurry may further include a grinding aid to increase the grinding efficiency and cut rate. A useful grinding aid can be inorganic based, such as a halide salt, for example, sodium cryolite, and potassium tetrafluoroborate; or organic based, such as a chlorinated wax, for example, polyvinyl chloride. A particular embodiment includes cryolite and potassium tetrafluoroborate with particle size ranging from 1 micron to 80 microns, and most typically from 5 microns to 30 microns. The weight percent of grinding aid is generally not greater than about 50 wt %, such as from about 0 wt % to 50 wt %, and most typically from about 10 wt % to 30 wt % of the entire slurry (including the abrasive grains).

Once cured into an abrasive article, the binder generally acts to secure abrasive grains onto a backing or into a surface structure or bonded structure. The performance of the binder may be determined by forming abrasive articles using variations on binder formulations with a standard abrasive grain. In a particular, the increased depth of cure using the binder and photoinitiator as described above increases the grain retention in the binder. Increased grain retention exhibits improved surface characteristics for the cured article.

FIG. 1 illustrates an exemplary embodiment of a coated abrasive article 100, which includes abrasive grains 106 secured to a backing or support member 102. Generally, the abrasive grains 106 are secured to the backing 102 by a make coat 104. The make coat 104 includes a binder, which is typically formed of a cured binder formulation.

The coated abrasive article 100 may further include a size coat 108 overlying the make coat 104 and the abrasive grains 106. The size coat 108 generally functions to further secure the abrasive grains 106 to the backing 102 and may also provide grinding aids. The size coat 108 is generally formed from a cured binder formulation that may be the same as or different from the make coat binder formulation.

The coated abrasive 100 may also, optionally, include a back coat 112. The back coat 112 functions as an anti-static layer, preventing abrasive grains from adhering to the back side of the backing 102 and preventing swarf from accumulating charge during sanding. In another example, the back coat 112 may provide additional strength to the backing 102 and may act to protect the backing 102 from environmental exposure. In another example, the back coat 112 can also act as a compliant layer. The compliant layer may act to relieve stress between the make coat 104 and the backing 102.

The backing 102 may be flexible or rigid. The backing 102 may be made of any number of various materials including those conventionally used as backings in the manufacture of coated abrasives. An exemplary flexible backing includes a polymeric film (including primed films), such as a polyolefin film (e.g., polypropylene including biaxially oriented polypropylene), a polyester film (e.g., polyethylene terephthalate), a polyamide film, a cellulose ester film, a metal foil, a mesh, a foam (e.g., natural sponge material or polyurethane foam), a cloth (e.g., cloth made from fibers or yarns comprising polyester, nylon, silk, cotton, poly-cotton or rayon), a paper, a vulcanized paper, a vulcanized rubber, a vulcanized fiber, a nonwoven material, or combinations thereof, or treated versions thereof. A cloth backing may be woven or stitch bonded. In particular examples, the backing 102 is selected from a group consisting of paper, polymer film, cloth, cotton, poly-cotton, rayon, polyester, poly-nylon, vulcanized rubber, vulcanized fiber, metal foil and a combination thereof. In other examples, the backing 102 includes polypropylene film or polyethylene terephthalate (PET) film.

The backing 102 may optionally have at least one of a saturant, a presize layer or a backsize layer. The purpose of these layers is typically to seal the backing 102 or to protect yarn or fibers in the backing 102. If the backing 102 is a cloth material, at least one of these layers is typically used. The addition of the presize layer or backsize layer may additionally result in a "smoother" surface on either the front or the back side of the backing. Other optional layers known in the art may also be used (e.g., a tie layer; see, for example, U.S. Pat. No. 5,700,302 (Stoetzel et al.)).

An antistatic material may be included in cloth treatment materials. The addition of an antistatic material can reduce the tendency of the coated abrasive article to accumulate static electricity when sanding wood or wood-like materials. Additional details regarding antistatic backings and backing treatments can be found in, for example, U.S. Pat. No. 5,108,463 (Buchanan et al.); U.S. Pat. No. 5,137,542 (Buchanan et al.); U.S. Pat. No. 5,328,716 (Buchanan); and 5,560,753 (Buchanan et al).

The backing 102 may be a fibrous reinforced thermoplastic such as described, for example, in U.S. Pat. No. 5,417,726 (Stout et al.), or an endless spliceless belt, as described, for example, in U.S. Pat. No. 5,573,619 (Benedict et al.). Likewise, the backing 102 may be a polymeric substrate having hooking stems projecting therefrom such as that described, for example, in U.S. Pat. No. 5,505,747 (Chesley et al.). Similarly, the backing 102 may be a loop fabric such as that described, for example, in U.S. Pat. No. 5,565,011 (Follett et al.).

In another example, a pressure-sensitive adhesive is incorporated onto the back side of the coated abrasive article such that the resulting coated abrasive article can be secured to a pad. An exemplary pressure-sensitive adhesive includes latex crepe, rosin, acrylic polymer or copolymer including polyacrylate ester (e.g., poly(butyl acrylate)), vinyl ether (e.g., poly(vinyl n-butyl ether)), alkyd adhesive, rubber adhesive (e.g., natural rubber, synthetic rubber, and chlorinated rubber), or a mixture thereof.

An exemplary rigid backing includes metal plate, ceramic plate, or the like. Another example of a suitable rigid backing is described, for example, in U.S. Pat. No. 5,417,726 (Stout et al.).

Coated abrasive articles, such as the coated abrasive article 100 of FIG. 1, may be formed by coating a backing with a binder formulation. Optionally, the backing may be coated with a compliant coat or back coat prior to coating with the make coat. Typically, the binder formulation is applied to the backing to form the make coat. In an embodiment, the make coat has a thickness of about 1 mil to about 50 mil. In an exemplary embodiment, the make coat has a thickness of about 50 mil. In one embodiment, the abrasive grains are applied with the binder formulation, wherein the abrasive grains are blended with the binder formulation to form abrasive slurry prior to application to the backing. Alternatively, the binder formulation is applied to the backing to form the make coat and the abrasive grains are applied to the make coat, such as through electrostatic and pneumatic methods. The binder formulation is cured such as through thermal methods or exposure to actinic radiation, such as ultraviolet radiation.

In an embodiment, the binder formulation is cured by ultraviolet radiation. In a particular embodiment, the ultraviolet radiation is at a line speed of about 30 to about 70 feet per minute. In an embodiment, the ultraviolet radiation is at a line speed of about 40 to about 60 feet per minute, or even about 50 feet per minute. In an embodiment, the ultraviolet radiation is a 600 W D-type bulb at a lamp output of greater than about 80%, such as greater than about 90%, or even greater than about 100%.

Optionally, a size coat is applied over the make coat and abrasive grains. The size coat may be applied prior to curing the make coat, the make coat and size coat being cured simultaneously. Alternatively, the make coat is cured prior to application of the size coat and the size coat is cured separately.

The binder formulation forming the make coat, the size coat, the compliant coat or the back coat may include the binder formulation. In a particular embodiment, the binder formulation is cured to form the size coat. In another embodiment, the binder formulation is cured to form the make coat. Alternatively, the binder formulation may be cured to form the optional compliant coat or the optional back coat.

In particular embodiments, the coats and abrasive grains may be patterned to form structures. For example, the make coat may be patterned to form surface structures that enhance abrasive article performance. Patterns may be pressed or rolled into the coats using, for example, a rotogravure apparatus to form a structured or engineered abrasive article.

Figure 2:
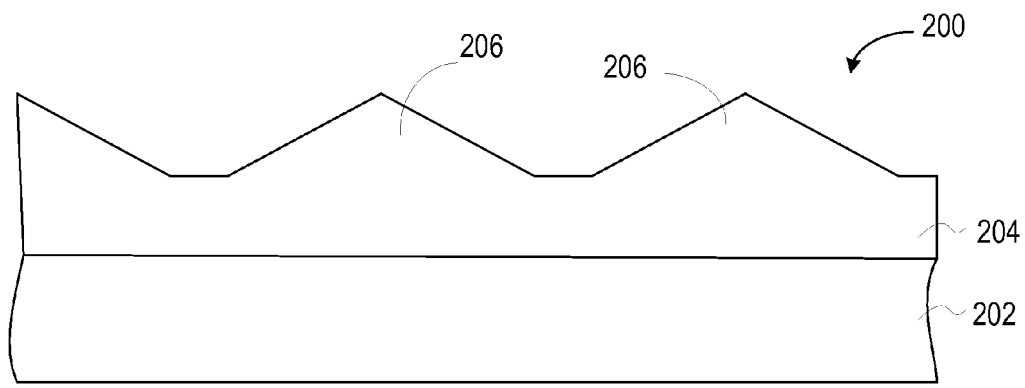
FIG. 2 includes an illustration of an exemplary structured abrasive article

An exemplary embodiment of an engineered or structured abrasive is illustrated in FIG. 2. Structured abrasives are coated abrasives including shaped structures disposed on a backing. Exemplary structured abrasives are disclosed in U.S. Pat. No. 6,293,980. The structured abrasive includes a backing 202 and a layer 204 including abrasive grains. The backing 202 may be formed of the materials described above in relation to the backing 102 of FIG. 1. Generally, the layer 204 is patterned to have surface structures 206.

The layer 204 may be formed as one or more coats. For example, the layer 204 may include a make coat and optionally a size coat. The layer 204 generally includes abrasive grains, a binder, and an oxime ester photoinitiator. In one exemplary embodiment, the abrasive grains are blended with the binder formulation to form abrasive slurry. Alternatively, the abrasive grains are applied to the binder after the binder is coated on the backing 202. Optionally, a functional powder may be applied over the layer 204 to prevent the layer 204 from sticking to the patterning tooling.

The structured abrasive article 200 may optionally include compliant and back coats (not shown). These coats may function as described above.

Figure 3:
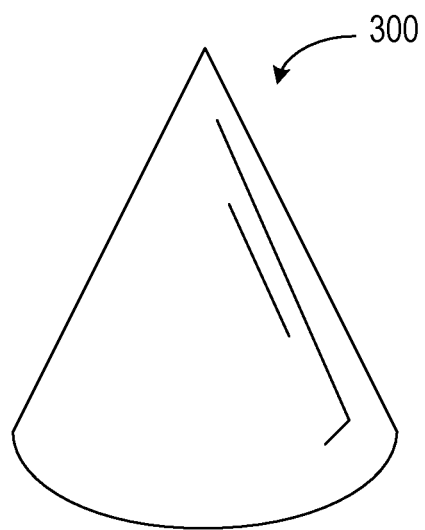
FIG. 3 includes an illustration of an exemplary bonded abrasive article.

In a further example, binder formulations may be used to form bonded abrasive articles, such as the abrasive article 300 illustrated in FIG. 3. In a particular embodiment, binder formulation including the oxime ester photoinitiator and abrasive grains are blended to form an abrasive slurry. The abrasive slurry is applied to a mold and the binder formulation is cured. The resulting abrasive article, such as article 300, includes the abrasive grains bound by nano-composite binder in a desired shape.

Embodiments of the above described binder formulation, binder, abrasive articles, and methods for forming same are particularly advantageous. For example, abrasive articles formed of binder formulations described above may exhibit low abrasive grain loss, leading to improved surface quality.

In addition, certain embodiments improve abrasive article life, leading to a reduction in the cost of grind and polishing steps and, thus, reducing product costs.

EXAMPLES

Cure depth is determined by testing binder formulations in a Petri dish at a thickness of about 0.5 cm for the five formulations. The samples are cured with a UV D-type bulb and line speed with one pass. The binder formulation is removed from the Petri dish and measured for the thickness of the cure.

Example 1

This example illustrates the influence of photoinitiator loading on cure depth. Table 1 illustrates the formulations and concentration of components in the formulations.

TABLE 1

| INGREDIENT | 1.1 Wt % | 1.2 Wt % | 1.3 Wt % | 1.4 Wt % | 1.5 Wt % |
|---|---|---|---|---|---|
| Eponox 1510 | 49.34 | 49.34 | 49.34 | 49.34 | 49.34 |
| OXT-101 | 13.02 | 13.02 | 13.02 | 13.02 | 13.02 |
| DPHA | 6.31 | 6.31 | 6.31 | 6.31 | 6.31 |
| SR-9003 | 3.16 | 3.16 | 3.16 | 3.16 | 3.16 |
| Irgacure OXE-01 | 1.27 | 0.64 | 0.32 | 0.16 | 0.08 |
| Chivacure 1176 | 3.39 | 3.39 | 3.39 | 3.39 | 3.39 |
| SiC J3000 | 23.51 | 23.51 | 23.51 | 23.51 | 23.51 |
| Total | 100.00 | 99.37 | 99.05 | 98.89 | 98.81 |
| Cure depth (inches) | 0.0045 | 0.0090 | 0.0405 | 0.0415 | 0.0200 |
| Cure depth (mil) | 4.5 | 9.0 | 40.5 | 41.5 | 20.0 |

As illustrated in this example, the cure depth reaches a maximum of 41.5 mils at a 0.16 weight % of the total weight of the binder formulation.

The cure depth is measured for two comparative through-cure photoinitiators, Irgacure 819 and Irgacure 250.

TABLE 2

| Initiator (wt) % | Cure depth using Irgacure 819 (mil) | Cure depth using Irgacure 250 (mil) |
|---|---|---|
| 0.48 | 10.5 | 4.0 |
| 0.96 | 10.5 | 4.5 |
| 1.44 | 10.0 | 5.0 |
| 1.92 | 10.0 | 6.5 |
| 4.00 | 9.0 | 6.5 |

The maximum cure depth of the photoinitiators is 10.5 mils and 6.5 mils for Irgacure 819 and Irgacure 250, respectively. As shown in Table 1, the oxime ester-based photoinitiator (Irgacure OXE 01) has a maximum depth of a cure that is greater than the previously used photoinitiators by 295% (Irgacure 819) and 538% (Irgacure 250).

The chemical class, solubility, and cure depth is summarized in Table 3.

TABLE 3

| Photoinitiator | Chemical class | Solubility (wt %) | Cure depth (mil) |
|---|---|---|---|
| Irgacure OXE01/02 | Oxime ester | >50 | 41.5 |
| Irgacure 819 | Bisacyle phosphine | <5 | 10.5 |
| Irgacure 250 | Iodonium salt | | 6.5 |

Irgacue OXE 01/02 has improved cure depth and solubility in comparison to Irgacure 819 and Irgacure 250.

The influence of the UV exposure to cure depth is measured for the oxime ester photoinitiator (Irgacure OXE 01) at 0.32 weight % versus different line speeds (feet per minute). As seen in Table 4, the cure depth is measured using a 600 Watt D-type UV lamp at line speeds of 50 feet/minute, 40 feet/minute and 30 feet/minute, respectively.

TABLE 4

| UV Lamp (D bulb) | Cure depth at 50 FPM (mil) | Cure depth at 40 FPM (mil) | Cure depth at 30 FPM (mil) |
|---|---|---|---|
| 300 W | 12.0 | 12.5 | 4.5 |
| 420 W | 21.0 | 29.0 | 5.5 |
| 540 W | 34.0 | 33.5 | 6.0 |
| 600 W | 40.5 | 34.5 | 6.5 |

Cure depth has optimal value at 600 W/50 feet per minute exposure with a D-type 600 W UV lamp.

The effect of UV exposure at various lamp exposures and line speeds is measured for the Irgacure OXE at 0.16 weight %. As seen in Table 5, the cure depth is measured for a 600 Watt D-type UV lamp used at various outputs.

TABLE 5

| UV Lamp (D-bulb) | Cure Depth at 50 FPM (mil) | Cure Depth at 40 FPM (mil) |
|---|---|---|
| 300 W | 12.0 | 13.0 |
| 420 W | 18.0 | 14.5 |
| 540 W | 24.0 | 17.5 |
| 600 W | 41.5 | 22.5 |

Cure depth has the best value at 600 W/50 feet per minute exposure with a D-type 600 W UV lamp.

The effect of the line speed can be seen for a D-type 600 W UV lamp at 600 W using 0.16 wt % of Irgacure OXE 01. Results are in Table 6.

TABLE 6

| Line speed (FPM) | Cure Depth (inch) | Cure Depth (mil) |
|---|---|---|
| 75 | 0.0050 | 5.0 |
| 60 | 0.0120 | 12.0 |
| 50 | 0.0415 | 41.5 |
| 40 | 0.0225 | 22.5 |
| 30 | 0.0075 | 7.5 |

As seen in Table 6, a line speed of 50 feet per minute gives a maximum cure depth of 41.5 mil for Irgacure OXE 01 at 0.16 wt %.

The above-disclosed subject matter is to be considered illustrative, and not restrictive, and the appended claims are intended to cover all such modifications, enhancements, and other embodiments, which fall within the true scope of the present invention.

The invention claimed is:
1. An abrasive article comprising:
a backing having a major surface; and
a make layer disposed over the major surface of the backing, wherein the make layer comprises a polymer matrix, an oxime ester photoinitiator, and abrasive grains, the make layer having abrasive grains blended with the polymeric matrix and wherein the oxime ester photoinitiator is present from about 0.08 wt % to about 0.16 wt % of the total weight of the make layer and increases the depth of ultraviolet cure of the make layer by at least about 50% compared to bis(2,4,6-trimethyl benzoyl) phenyl phosphine oxide, wherein the make layer has a color measurement L* of less than about 50 using the CIE 1976 L*a*b* scale.

2. The abrasive article of claim 1, wherein the photoinitiator increases the depth of cure of the make layer by at least about 100% compared to bis(2,4,6-trimethyl benzoyl) phenyl phosphine oxide.

3. The abrasive article of claim 1, wherein the photoinitiator has a solubility of at least about 40% by weight.

4. The abrasive article of claim 1, wherein the make layer includes a cationically polymerizable component.

5. The abrasive article of claim 4, wherein the cationically polymerizable component is selected from the group consisting of a cyclic ether component, a cyclic lactone component, a cyclic acetal component, a cyclic thioether component, a spiro orthoester component, an epoxy-functional component, and an oxetane-functional component.

6. The abrasive article of claim 5, wherein the cationically polymerizable component is an epoxy-functional component or an oxetane-functional component.

7. The abrasive article of claim 1, wherein the abrasive grains are selected from the group consisting of silica, alumina, zirconia, silicon carbide, silicon nitride, boron nitride, garnet, diamond, cofused alumina zirconia, ceria, titanium diboride, boron carbide, flint, emery, alumina nitride, agglomerated grains, and blends thereof.

8. The abrasive article of claim 1, wherein the make layer further includes a filler.

9. The abrasive article of claim 1, wherein the backing includes a polymer film, cloth, paper, vulcanized paper, vulcanized rubber, vulcanized fiber, non-woven materials, mesh, foam, metal foil, metal plate, ceramic plate, or combination thereof.

10. The abrasive article of claim 1, wherein the make layer is cured to a depth of at least about 15 mils.

11. The abrasive article of claim 10, wherein the make layer is cured to a depth of at least about 20 mils.

12. The abrasive article of claim 1, wherein the make layer further includes a secondary cationic photoinitiator.

13. The abrasive article of claim 1, wherein the oxime ester photoinitiator and increases the depth of ultraviolet cure of the make layer by at least about 100% compared to bis(2,4,6-trimethyl benzoyl) phenyl phosphine oxide.

14. The abrasive article of claim 1, wherein the oxime ester photoinitiator and increases the depth of ultraviolet cure of the make layer by at least about 200% compared to bis(2,4,6-trimethyl benzoyl) phenyl phosphine oxide.

15. An abrasive article comprising:
a backing having a major surface; and
a make layer disposed over the major surface of the backing, wherein the make layer includes a cationically polymerizable component, an oxime ester photoinitiator present from about 0.08 wt % to about 0.16 wt % of the total weight of the make layer, and abrasive grains blended with the make layer, wherein the make layer has a color measurement L* of less than about 50 using the CIE 1976 L*a*b* scale.

16. The abrasive article of claim 15, wherein the cationically polymerizable component is selected from the group consisting of a cyclic ether component, a cyclic lactone component, a cyclic acetal component, a cyclic thioether component, a spiro orthoester component, an epoxy-functional component, and an oxetane-functional component.

17. The abrasive article of claim 16, wherein the cationically polymerizable component is an epoxy-functional component or an oxetane-functional component.

18. The abrasive article of claim 15, wherein the make layer further includes abrasive grains, filler, or combination thereof.

19. The abrasive article of claim 18, wherein the abrasive grains are selected from the group consisting of silica, alumina, zirconia, silicon carbide, silicon nitride, boron nitride, garnet, diamond, cofused alumina zirconia, ceria, titanium diboride, boron carbide, flint, emery, alumina nitride, agglomerated grains, and blends thereof.

20. The abrasive article of claim 15, wherein the make layer is cured to a depth of at least about 15 mils.

21. The abrasive article of claim 20, wherein the make layer is cured to a depth of at least about 20 mils.

22. A method of forming an abrasive article, the method comprising:
coating a make layer on a major surface of a backing to a thickness of about 50 mils, wherein the make layer includes an oxime ester photoinitiator present from about 0.08 wt % to about 0.16 wt % of the total weight of the make layer and abrasive grains blended with the make layer, wherein the make layer has a color measurement L* of less than about 50 using the CIE 1976 L*a*b* scale; and
curing the make layer to a depth of at least about 15 mils.

23. The method of claim 22, wherein curing the make layer includes ultraviolet treatment.

* * * * *